US011448218B2

(12) United States Patent
Lässer et al.

(10) Patent No.: US 11,448,218 B2
(45) Date of Patent: Sep. 20, 2022

(54) DISPLACEMENT MACHINE ACCORDING TO THE SPIRAL PRINCIPLE, METHOD TO REGULATE PRESSURE IN THE COUNTER-PRESSURE CHAMBER BY USING A PRESSURE DIFFERENCE AND CHARACTERISTIC CURVE

(71) Applicant: OET GmbH, Lustenau (AT)

(72) Inventors: Roman Lässer, Dornbirn (AT); Christian Schmälzle, Lauterach (AT); Uwe Wuitz, Lustenau (AT); Christian Busch, Feldkirch (AT); Frank Obrist, Bregenz (AT)

(73) Assignee: OET GmbH, Lustenau (AT)

( * ) Notice: Subject to any disclaimer, the term of this patent is extended or adjusted under 35 U.S.C. 154(b) by 294 days.

(21) Appl. No.: 15/777,357

(22) PCT Filed: Nov. 18, 2016

(86) PCT No.: PCT/EP2016/078141
§ 371 (c)(1),
(2) Date: May 18, 2018

(87) PCT Pub. No.: WO2017/085256
PCT Pub. Date: May 26, 2017

(65) Prior Publication Data
US 2019/0072094 A1      Mar. 7, 2019

(30) Foreign Application Priority Data

Nov. 20, 2015   (DE) ..................... 10 2015 120 151.8

(51) Int. Cl.
*F04C 29/00*     (2006.01)
*F04C 18/02*     (2006.01)
(Continued)

(52) U.S. Cl.
CPC ...... *F04C 29/0021* (2013.01); *F04C 18/0207* (2013.01); *F04C 18/0215* (2013.01);
(Continued)

(58) Field of Classification Search
None
See application file for complete search history.

(56) References Cited

U.S. PATENT DOCUMENTS 5,462,418 A * 10/1995 Shimizu ................. F01C 17/06
418/55.3
5,762,483 A    6/1998 Lifson et al.
(Continued)

FOREIGN PATENT DOCUMENTS

CN    1378620 A    11/2002
CN    1823227 A    8/2006
(Continued)

OTHER PUBLICATIONS

Machine Translation of DE102013021250 (obtained from https://translationportal.epo.org/ retrieved on Jul. 24, 2020) (Year: 2020).*
(Continued)

*Primary Examiner* — Peter J Bertheaud
*Assistant Examiner* — Geoffrey S Lee
(74) *Attorney, Agent, or Firm* — Schwegman Lundberg & Woessner, P.A.

(57) ABSTRACT

The invention relates to a displacement machine according to the spiral principle, in particular a scroll compressor or scroll expander, with a high-pressure chamber, a low-pressure chamber and an orbiting displacement spiral, which engages in a counter-spiral such that chambers are formed between the displacement spiral and the counter-spiral for receiving a working medium, wherein a counter-pressure chamber is formed between the low-pressure chamber and the displacement spiral. According to the invention a pres-
(Continued)

sure regulating device which is fluidically connected to the counter-pressure chamber sets a pressure difference between the counter-pressure chamber and the low-pressure chamber by means of a set value specified by the computing unit.

14 Claims, 3 Drawing Sheets

(51) Int. Cl.
  *B60H 1/32* (2006.01)
  *F04C 29/12* (2006.01)
(52) U.S. Cl.
  CPC ...... *F04C 18/0253* (2013.01); *F04C 18/0284* (2013.01); *F04C 29/0042* (2013.01); *F04C 29/0057* (2013.01); *F04C 29/12* (2013.01); *B60H 2001/325* (2013.01); *F04C 2210/26* (2013.01); *F04C 2270/185* (2013.01); *F04C 2270/46* (2013.01); *F04C 2270/585* (2013.01)

(56) References Cited

U.S. PATENT DOCUMENTS

| | | | |
|---|---|---|---|
| 6,231,316 | B1 | 5/2001 | Wakisaka et al. |
| 6,301,912 | B1* | 10/2001 | Terai ............... F04C 23/008 |
| | | | 418/55.5 |
| 7,699,589 | B2 | 4/2010 | Terauchi |
| 9,512,840 | B2* | 12/2016 | Obrist ............... F04C 18/0284 |
| 10,094,379 | B2 | 10/2018 | Won et al. |
| 10,527,041 | B2 | 1/2020 | Moon et al. |
| 10,801,496 | B2 | 10/2020 | Obrist et al. |
| 11,131,306 | B2 | 9/2021 | Obrist et al. |
| 2003/0074905 | A1* | 4/2003 | Taira ............... C09K 5/045 |
| | | | 62/114 |
| 2006/0254309 | A1* | 11/2006 | Takeuchi ............ F01K 23/02 |
| | | | 62/501 |
| 2008/3813341 | | 2/2008 | Sawai et al. |
| 2010/0158710 | A1* | 6/2010 | Umemura ........... F04C 27/005 |
| | | | 417/310 |
| 2012/0230854 | A1 | 9/2012 | Chikano et al. |
| 2013/0216416 | A1 | 8/2013 | Takeda et al. |
| 2013/0280115 | A1 | 10/2013 | Kawamura et al. |
| 2014/0348679 | A1 | 11/2014 | Ignatiev et al. |
| 2014/0348681 | A1* | 11/2014 | Obrist ............... F04C 18/0253 |
| | | | 418/55.5 |
| 2015/0260189 | A1 | 9/2015 | Kato |
| 2016/0177953 | A1 | 6/2016 | Sun |
| 2018/0255961 | A1* | 9/2018 | Vetterli ............. A47J 31/461 |
| 2018/0258933 | A1 | 9/2018 | Obrist et al. |
| 2018/0335032 | A1 | 11/2018 | Obrist et al. |

FOREIGN PATENT DOCUMENTS

| | | |
|---|---|---|
| CN | 101052807 A | 10/2007 |
| CN | 101297117 A | 10/2008 |
| CN | 101761478 A | 6/2010 |
| CN | 102297132 A | 12/2011 |
| CN | 102788016 A | 11/2012 |
| CN | 104105881 A | 10/2014 |
| CN | 104179682 A | 12/2014 |
| CN | 105026763 A | 11/2015 |
| DE | 10147339 A1 | 5/2002 |
| DE | 112005002722 | 12/2007 |
| DE | 102013020762 | 6/2015 |
| DE | 102013021250 | 6/2015 |
| DE | 102013021250 A1 * | 6/2015 ............ F01C 1/0215 |
| EP | 2479435 A1 | 7/2012 |
| EP | 2806164 | 11/2014 |
| JP | S58-190591 U | 11/1983 |
| JP | S61-8407 Y2 | 1/1986 |
| JP | S61-1169686 | 7/1986 |
| JP | H01-271680 A | 10/1989 |
| JP | H03-258985 A | 11/1991 |
| JP | 312582432 | 6/1994 |
| JP | 2005140016 A | 6/2005 |
| JP | 2006214379 A | 8/2006 |
| JP | 2010150967 A | 7/2010 |
| JP | 2010185299 | 8/2010 |
| JP | 2011-064189 A | 3/2011 |
| JP | 2013-234666 A | 11/2013 |
| JP | 2013-249733 A | 12/2013 |
| JP | 2014228002 A | 12/2014 |
| KR | 10-1998-0070887 A | 10/1998 |
| KR | 20100017006 A | 2/2010 |
| KR | 10-1344114 B1 | 12/2013 |
| KR | 10-1355114 B1 | 1/2014 |
| WO | WO-2009017157 | 2/2009 |
| WO | WO-2016/190490 A1 | 12/2016 |
| WO | WO-2017085256 | 5/2017 |

OTHER PUBLICATIONS

"German Application 10 2015 120 151.8, German Search Report dated Sep. 28, 2016", (dated Sep. 28, 2016), 10 pgs.
"International Application No. PCT/EP2016/078141, International Search Report and Written Opinion dated Jan. 10, 2017", (dated Jan. 10, 2017), 11 pgs.
"Chinese Application No. 201680059981.4, First Office Action dated Nov. 5, 2018", (dated Nov. 5, 2018), 11 pgs.
"International Application No. PCT/EP2016/078141, International Preliminary Report on Patentability dated May 31, 2018", (dated May 31, 2018), 9 pgs.
"Chinese Application No. 201680059981.4, Second Office Action dated Jul. 10, 2019", (dated Jul. 10, 2019), 25 pgs.
"Japanese Application No. 2018-518680, Notice of Reasons for Rejection dated May 28, 2019", (dated May 28, 2019), 11 pgs.
"U.S. Appl. No. 15/934,476, Examiner Interview Summary dated May 17, 2021", 4 pgs.
"U.S. Appl. No. 15/934,476, Final Office Action dated Feb. 1, 2021", 18 pgs.
"U.S. Appl. No. 15/934,476, Non Final Office Action dated Jul. 15, 2020", 17 pgs.
"U.S. Appl. No. 15/934,476, Notice of Allowance dated Jun. 18, 2021", 10 pgs.
"U.S. Appl. No. 15/934,476, Response filed May 26, 2021 to Final Office Action dated Feb. 1, 2021", 9 pgs.
"U.S. Appl. No. 15/934,476, Response filed Oct. 15, 2020 to Non Final Office Action dated Jul. 15, 2020", 16 pgs.
"Chinese Application No. 201810447978.0, First Office Action and Search Report dated Mar. 31, 2021", (dated Mar. 31, 2021), 9 pgs.
"English Machine Translation of KR101355114(B1)", (Jun. 13, 2020), 9 pgs.
"European Application No. 18167002.7, Extended European Search Report dated Oct. 8, 2018", (dated Oct. 8, 2018), 7 pgs.
"Japanese Application No. 2018-054630, Notice of Reasons for Rejection dated Jul. 9, 2019", (dated Jul. 9, 2019), 5 pgs.
"Japanese Application No. 2018-518680, Written Opinion and Amendment filed Aug. 26, 2019 in response to Notice of Reasons for Rejection dated May 28, 2019", (w/ English Translation), 20 pgs.
"Korean Application Serial No. 10-2018-0037220, Office Action dated Jul. 17, 2019", (w/ English Translation), 14 pgs.
"Korean Application Serial No. 10-2018-0037220, Written Opinion and Amendment filed Sep. 17, 2019 in response to Office Action dated Jul. 17, 2019", (w/ English Translation), 24 pgs.

* cited by examiner

DISPLACEMENT MACHINE ACCORDING TO THE SPIRAL PRINCIPLE, METHOD TO REGULATE PRESSURE IN THE COUNTER-PRESSURE CHAMBER BY USING A PRESSURE DIFFERENCE AND CHARACTERISTIC CURVE

PRIORITY CLAIM TO RELATED APPLICATIONS

This application is a U.S. national stage filing under 35 U.S.C. § 371 from International Application No. PCT/EP2016/078141, filed on 18 Nov. 2016, and published as WO2017/085256 on 26 May 2017, which claims the benefit under 35 U.S.C. 119 to German Application No. 10 2015 120 151.8, filed on 20 Nov. 2015; the benefit of priority of each of which is claimed herein, and which applications and publication are hereby incorporated herein by reference in their entirety.

BACKGROUND

Scroll compressors and/or scroll expanders are sufficiently known from the state of the art. These comprise a high-pressure chamber, a low-pressure chamber and an orbiting displacement spiral. The orbiting displacement spiral engages, as for example depicted in EP 2 806 164 A1, in a counter-spiral such that chambers are formed between the displacement spiral and the counter-spiral, in order to receive a working medium. A receiving space, i.e. a counter-pressure chamber is formed between the low-pressure chamber and the displacement spiral. Such a counter-pressure chamber is also known by the term "back-pressure space".

SUMMARY

The invention relates to a displacement machine according to the spiral principle, in particular scroll compressor or scroll expander, with a high-pressure chamber, a low-pressure chamber and an orbiting displacement spiral, which engages in a counter-spiral such that chambers are formed between the displacement spiral and the counter-spiral for receiving a working medium, wherein the counter-pressure chamber is formed between the low-pressure chamber and the displacement spiral. The invention further relates to a method for operating a displacement machine, in particular a displacement machine according to the invention. Further the invention relates to a vehicle air-conditioning system as well as a vehicle with a displacement machine according to the invention.

The invention is based on the requirement to further develop a displacement machine according to the spiral principle such that variable operating points can be set or very precisely set for the pressure in the counter-pressure chamber. The invention is further based on the requirement to propose a further developed method for operating a displacement machine according to the spiral principle. In addition the requirement consists in proposing a vehicle air-conditioning system and/or a vehicle with a further developed displacement machine according to the spiral principle.

According to the invention this requirement is met, as regards the displacement machine according to the spiral principle, as regards the method for operating a displacement machine, as regards the vehicle air-conditioning system, and as regards the vehicle, by the subject matter disclosed herein.

Advantageous and convenient designs of the inventive displacement machine according to the spiral principle/the inventive method for operating a displacement machine/the inventive vehicle air-conditioning system are cited in the sub-claims.

The invention is based on the idea to propose a displacement machine according to the spiral principle, in particular a scroll compressor or a scroll expander, with a high-pressure chamber, a low-pressure chamber and an orbiting displacement spiral which engages in a counter spiral such that chambers are formed between the displacement spiral and the counter-spiral for receiving a working medium. A counter-pressure chamber is formed between the low-pressure chamber and the displacement spiral.

According to the invention a pressure-regulating unit fluidically connected to the counter-pressure chamber is formed, which by means of a set value specified by the computing unit sets a pressure difference between the counter-pressure chamber and the low-pressure chamber. With the aid of the pressure-regulating unit and a set value specified by a computing unit a pressure in the counter-pressure chamber can thus be set for variable operating points.

In one embodiment of the invention chambers are formed between the displacement spiral and the counter-spiral which migrate radially inwards in order to receive, in particular to suck in, a working medium, in particular a refrigerant, from the low-pressure chamber, to compress it and to eject it into the high-pressure chamber. According to this embodiment of the invention, the displacement machine operates, in particular, as a scroll compressor. In other words this displacement machine is a scroll compressor.

In a further embodiment of the invention radially outward migrating chambers are formed between the displacement spiral and the counter-spiral, in order to receive from the high-pressure chamber a working medium, in particular a working fluid, in particular a heating medium, to expand it and to eject it into the low-pressure chamber. According to this depicted embodiment of the invention the displacement machine operates according to the spiral principle, in particular as a scroll expander. The described mode of operation/the described process in conjunction with a scroll expander can also be called a Clausius-Rankine process. The process which can be carried out with the aid of the displacement machine according to the invention is also known as the Organic Rankine Cycle (ORC), wherein the organic component may be, in one example, ethanol.

The pressure regulating device preferably comprises an electrically controllable regulating valve. Furthermore it is possible that the pressure regulating device comprises an electrically controllable regulating valve as well as a throttle. It is possible that a/the electrically controllable regulating valve forms a fluid connection between the counter-pressure chamber and the high-pressure chamber or the low-pressure chamber. In other words, the counter-pressure chamber is fluidically connected either with the high-pressure chamber or with the low-pressure chamber by means of the electrically controllable regulating valve, depending on the design of the displacement machine.

The electrically controllable regulating valve preferably comprises a displaceable valve needle which can be electromagnetically activated. The displaceable valve needle sets, for example, an annular gap relative to a housing of the electrically controllable regulating valve, so that a fluid connection is formed by means of the annular gap from the counter-pressure chamber to the high-pressure chamber or from the counter-pressure chamber to the low-pressure chamber. The valve needle is preferably arranged in a magnetic coil so that the electromagnetic force acting on the valve needle can be adjusted by a control current acting on the magnetic coil.

In one embodiment of the invention the electrically controllable regulating valve is arranged in the displacement machine such that the regulating valve forms a fluid connection between the counter-pressure chamber and the low-pressure chamber, wherein a throttle included in the pressure regulating device is arranged between the high-pressure chamber and the counter-pressure chamber.

With this embodiment of the invention provided the displacement machine is configured as a scroll compressor, the throttle causes the working medium flowing out of the high-pressure chamber and into the counter-pressure chamber to be reduced initially as regards pressure. From the counter-pressure chamber the working medium can flow into the low-pressure chamber by means of the electrically controllable regulating valve.

With a further and/or an alternative embodiment of the invention a/the electrically controllable regulating valve is arranged such that the regulating valve fluidically connects the high-pressure chamber and the counter-pressure chamber, wherein a/the throttle is arranged between the counter-pressure chamber and the low-pressure chamber.

Provided the displacement machine is configured as a scroll compressor the electrically controllable regulating valve establishes a fluid connection between the high-pressure chamber and the counter-pressure chamber, so that the working medium can flow from the high-pressure chamber into the counter-pressure chamber. With the aid of the electrically controllable regulating valve, in particular due to setting an annular gap between a displaceable valve needle and a housing section, the flow of the working medium from the high-pressure side to the counter-pressure chamber can be adjusted.

The displacement spiral is preferably movable relative to the counter spiral in axial direction. Thus the orbiting, i.e. the rotatably movable displacement spiral is additionally movable in axial direction. The displacement spiral can be moved both in direction of the counter-spiral and also away from the same. Preferably the counter-spiral is fitted into the displacement machine in an altogether stationary manner. In other words, the counter-spiral is completely immovable both in axial direction and in rotational direction.

A contact pressure acting from the displacement spiral onto the counter-spiral in axial direction is preferably able to be set by the pressure in the counter-pressure chamber. In other words, the movement of the displacement spiral in axial direction is preferably caused by the pressure prevailing in the counter-pressure chamber. Depending on the pressure prevailing in the counter-pressure chamber a contact pressure can be set, which acts in axial direction from the displacement spiral onto the counter-spiral.

The displacement machine according to the invention may be configured as a displacement machine which is driven electrically and/or by an electric motor or as a displacement machine with a mechanical drive.

The working medium may for example be $CO_2$ and/or R134a and/or R1234yf and/or butane and/or ethanol and/or cyclopentane.

A secondary aspect of the invention relates to a method for operating a displacement machine, in particular for operating a displacement machine according to the invention, such as described above. The method for operating a displacement machine as per the invention comprises the following steps:

a) Ascertaining a pressure value $P_D$ in a high-pressure section of the displacement machine or in a high-pressure section of a system in which the displacement machine is installed, b) Forwarding the ascertained pressure value $P_D$ to a computing unit, c) Determining a differential pressure value $\Delta P_{BP}$ between a counter-pressure $P_{BP}$ prevailing in a counter-pressure chamber and a low pressure $P_S$ prevailing in a low-pressure chamber by using a characteristic line and/or a characteristic field with the aid of the ascertained pressure value $P_D$, wherein the characteristic line and/or the characteristic field is stored in the computing unit, d) Controlling a pressure regulating device, in particular an electrically controllable regulating valve, by means of a control current applied to a magnetic coil and autonomously adjusting the differential pressure value $\Delta P_{BP}$ by means of the electric regulating valve.

The high-pressure area of the displacement machine may for example be a high-pressure chamber of the displacement machine. Alternatively and/or additionally it is feasible that the pressure value $P_D$ is ascertained/measured in a high-pressure area of a system such as in an air-conditioning system and/or a vehicle, in which the displacement machine is installed. A displacement machine according to the invention can, in accordance with the described method, comprise, in a high-pressure section, in particular in the high-pressure chamber, a sensor for detecting the pressure value in the high-pressure chamber.

Based on the ascertained pressure value a differential pressure value $\Delta P_{BP}$ can be determined with the aid of a characteristic line and/or a characteristic field. In other words, an ascertained pressure value $P_D$ in a characteristic line and/or a characteristic field is associated with an ideal or desirable differential pressure value $\Delta P_{BP}$. The differential pressure value $\Delta P_{BP}$ is formed between the counter-pressure chamber and the low-pressure chamber.

In other words, the pressure regulating device, in particular the electrically controllable regulating valve, is controlled by means of the ascertained pressure value. To this end the magnetic coil of the electrically controllable regulating valve in particular is activated. Preferably this is done using a control current which is stored in a characteristic line and/or a characteristic field in the computing unit and which is applied to a magnetic coil.

Due to applying a control current, which is related to the ascertained pressure value $P_D$, to a magnetic coil, it is possible for the determined differential pressure value $\Delta P_{BP}$ to be automatically adjusted by the electric regulating valve.

The electrically controllable regulating valve is preferably a mechanical self-regulating valve. The mechanical self-regulation is effected based on an equalised pressure balance or, in other words, a balanced force equilibrium.

With the aid of the determined differential pressure value $\Delta P_{BP}$ and the determined control current associated therewith an electromagnetic force is set for a/the valve needle of the electrically controllable regulating valve. The valve needle is impacted, not only by a spring force and the force/the pressure of the counter-pressure chamber, but also by the electromagnetic force from the magnetic coil. The method according to the invention for operating a displacement machine is, above all, applied according to the depicted embodiment to displacement machines, which comprise an electrically controllable regulating valve fluidically connecting the counter-pressure chamber and the low-pressure chamber. Accordingly the valve needle is also impacted by the pressure/the force of the low-pressure chamber.

Due to the control current acting on the magnetic coil an electromagnetic force is established which counteracts the force of the low-pressure chamber and the force of the counter chamber. In order to achieve an equalised force balance, the electrically controllable regulating valve independently regulates the pressure of the counter chamber in dependence of the pressure of the low-pressure chamber. A through-opening cross-section, which is formed as an annular surface between the valve needle and a housing section of the regulating valve, is independently set by the electrically controllable regulating valve. The through-opening cross-section between the pressure in the low-pressure chamber and the pressure in the counter-pressure chamber is, in other words, independently adjusted by the electrically controllable regulating valve.

A further secondary aspect of the invention relates to a method for operating a displacement machine, in particular a displacement machine according to the invention, as it has been described in the beginning. The method according to the invention comprises the following steps:
a) Ascertaining a pressure value $P_D$ in a high-pressure section of the displacement machine or in a high-pressure section of a system in which the displacement machine is installed, and a pressure value $P_S$ in a low-pressure chamber of the displacement machine,
b) Forwarding the ascertained pressure values $P_D$ and $P_S$ to a computing unit,
c) Determining a differential pressure value $\Delta P_{BP}$ between a counter-pressure $P_{BP}$ prevailing in a counter-pressure chamber and a low pressure $P_S$ prevailing in a low-pressure chamber by way a characteristic line and/or a characteristic field with the aid of the ascertained pressure value $P_D$, wherein the characteristic line and/or the characteristic field is stored in the computing unit,
d) Controlling a pressure regulating device, in particular an electrically controllable regulating valve, by means of a control current applied to a magnetic coil and autonomously adjusting the differential pressure value $\Delta P_{BP}$ by means of the electric regulating valve.

This method according to the invention is preferably performed with the aid of a displacement machine, which comprises an electrically controllable regulating valve, which fluidically connects the high-pressure chamber and the counter-pressure chamber, wherein a throttle is arranged between the counter-pressure chamber and the low-pressure chamber. The ascertained pressure value $P_D$ in a high-pressure section of the displacement machine may for example be ascertained in a high-pressure chamber of the displacement machine. Alternatively or and/or additionally it is possible for the pressure value $P_D$ to be ascertained in a high-pressure section of a system such as a vehicle and/or an air-conditioning system, in which the displacement machine is installed.

In this respect the associated displacement machine according to the invention may comprise a pressure sensor for ascertaining the pressure value $P_D$ in a high-pressure section of the displacement machine, in particular in a high-pressure chamber of the displacement machine. The pressure value $P_D$ is preferably the high-pressure prevailing in the displacement machine/the high pressure prevailing in the system in which the displacement machine has been installed.

As regards the pressure $P_S$ to be measured in the low-pressure chamber the displacement machine according to the invention may comprise a pressure sensor in the low-pressure chamber, which ascertains the low pressure $P_S$. The low pressure $P_S$ thus is the low pressure prevailing in the low-pressure chamber.

A differential pressure value $\Delta P_{BP}$ is determined with the aid of the ascertained pressure values $P_D$ and $P_S$, i.e. with the aid of the ascertained value with regard to the low pressure $P_S$ and the ascertained value with regard to the high pressure $P_D$. The determined differential pressure value $\Delta P_{BP}$ is connected to a determined control current, which acts upon a magnetic coil of the pressure control device, in particular the electrically controllable regulating valve. The regulating valve is acted upon by a spring force, the force/the pressure in the counter-pressure chamber as well as the force/the pressure in the high-pressure chamber. In addition this electrically controllable regulating valve is impacted by an electromagnetic force of the magnetic coil, wherein the electromagnetic force can be adjusted by the control current.

In conjunction with both secondary methods for operating a displacement machine it may be provided that in controlling the pressure control device, in particular the electrically controllable regulating valve, the determined differential pressure value $\Delta P_{BP}$ is associated with an electric amperage for controlling a valve element, in particular a valve needle, which is arranged in a magnetic coil.

A/the magnetic coil of the valve element is preferably acted upon by the electric amperage so that an electromagnetic force is established, which acts on the valve needle.

With the aid of the method according to the invention for operating a displacement machine it is possible to set the pressure in the counter-pressure chamber to variable operating points. In particular the pressure can be set very accurately as specified. This is effected, in particular, by adjusting the differential pressure value between the counter-pressure chamber and the low-pressure chamber.

A further secondary aspect of the invention relates to a vehicle air-conditioning system with a displacement machine according to the invention, in particular with a scroll compressor according to the invention. The resulting advantages are similar to those as specified in conjunction with the displacement machine according to the invention and/or the method according to the invention for operating a displacement machine.

The vehicle air-conditioning system contains a refrigerant, wherein this refrigerant may be, for example, $CO_2$ and/or R134a and/or R1234yf and/or butane and/or ethanol and/or water.

The refrigerant used may be, in particular, hydrofluorocarbon (HFC). A typical hydrofluorocarbon is R134a. Furthermore it is possible to use hydrofluorooleofin (HFO) as a refrigerant. In this respect reference is made to R1234yf as an example. Furthermore hydrocarbon (HC) may be used as a refrigerant in a vehicle air-conditioning system. Typical hydrocarbons are propane and butane. The other media which are also listed, i.e. $CO_2$, ethanol or water are independent working media.

A further secondary aspect of the invention relates to a vehicle, in particular a hybrid vehicle, with a displacement machine according to the invention and/or a vehicle air-conditioning system. The advantages are similar to those already mentioned in conjunction with the displacement machine according to the invention and/or the method for operating a displacement machine according to the invention and/or for the vehicle air-conditioning system according to the invention. The vehicle according to the invention is, in particular, an electrical hybrid vehicle.

A further secondary aspect of the invention relates to a vehicle, in particular a lorry with a displacement machine according to the invention, in particular with a scroll expander according to the invention. The resulting advantages are similar to those as already mentioned in conjunction with the displacement machine according to the invention and/or the method according to the invention for operating a displacement machine. In the field of commercial vehicles (lorries) scroll expanders should preferably be used in the context of exhaust gas recovery or energy recovery. Here it is possible to use both scroll expanders with a mechanical load and scroll compressors which are electrically driven or driven by an electric motor.

BRIEF DESCRIPTION OF DRAWINGS

The invention will now be explained in detail by way of exemplary embodiments with reference to the attached schematic drawings, in which.

DETAILED DESCRIPTION

Two embodiments of a displacement machine according to the invention will now be explained, wherein the embodiments shown represent scroll compressors. It is pointed out that the displacement machine according to the invention may also be configured and operated as a scroll expander.

Identical parts and parts having the same function are marked with the same reference symbols.

Figure 1:
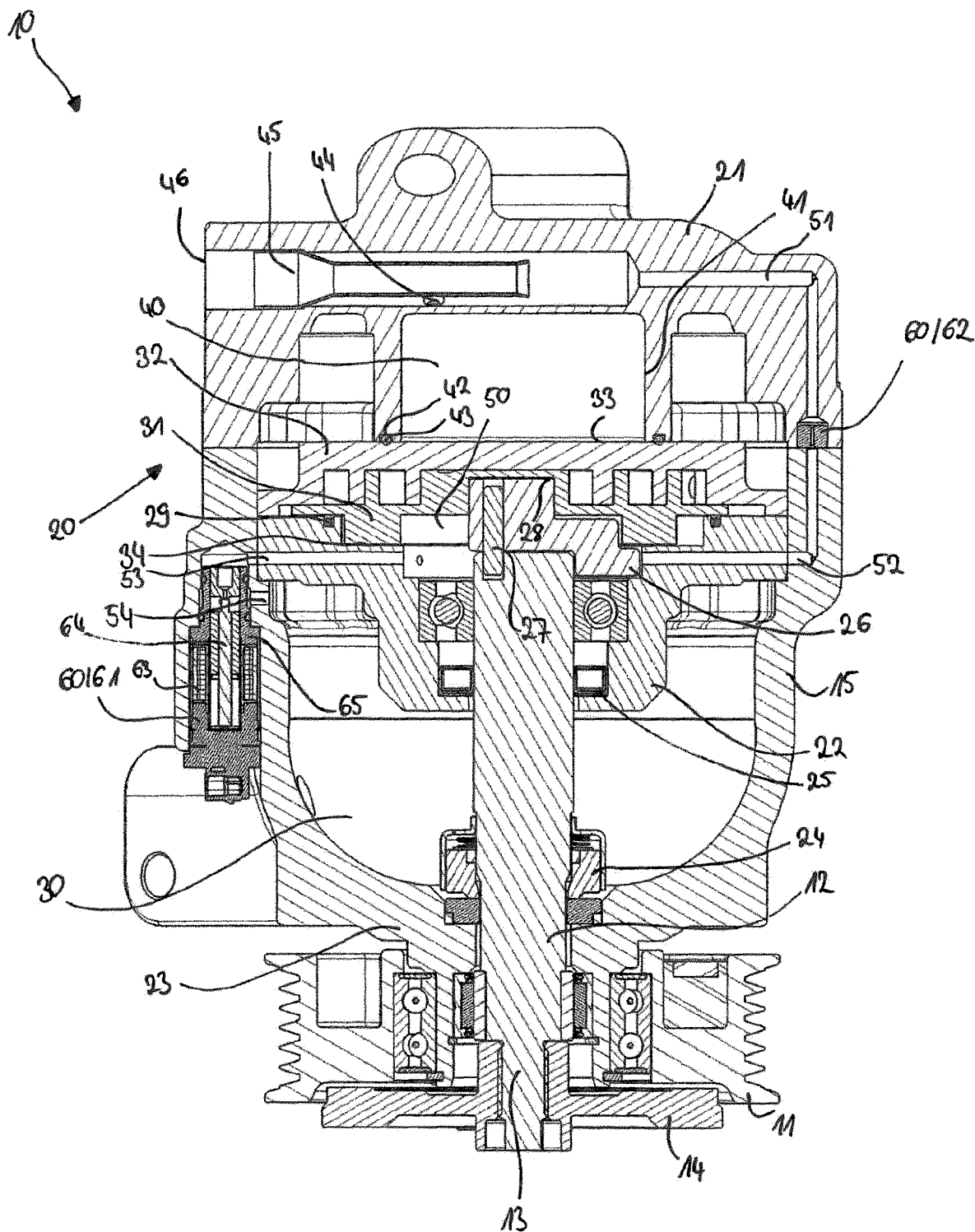
FIG. 1 shows a longitudinal section through a displacement machine according to the invention, in particular a scroll compressor according to a first embodiment.
Figure 2:
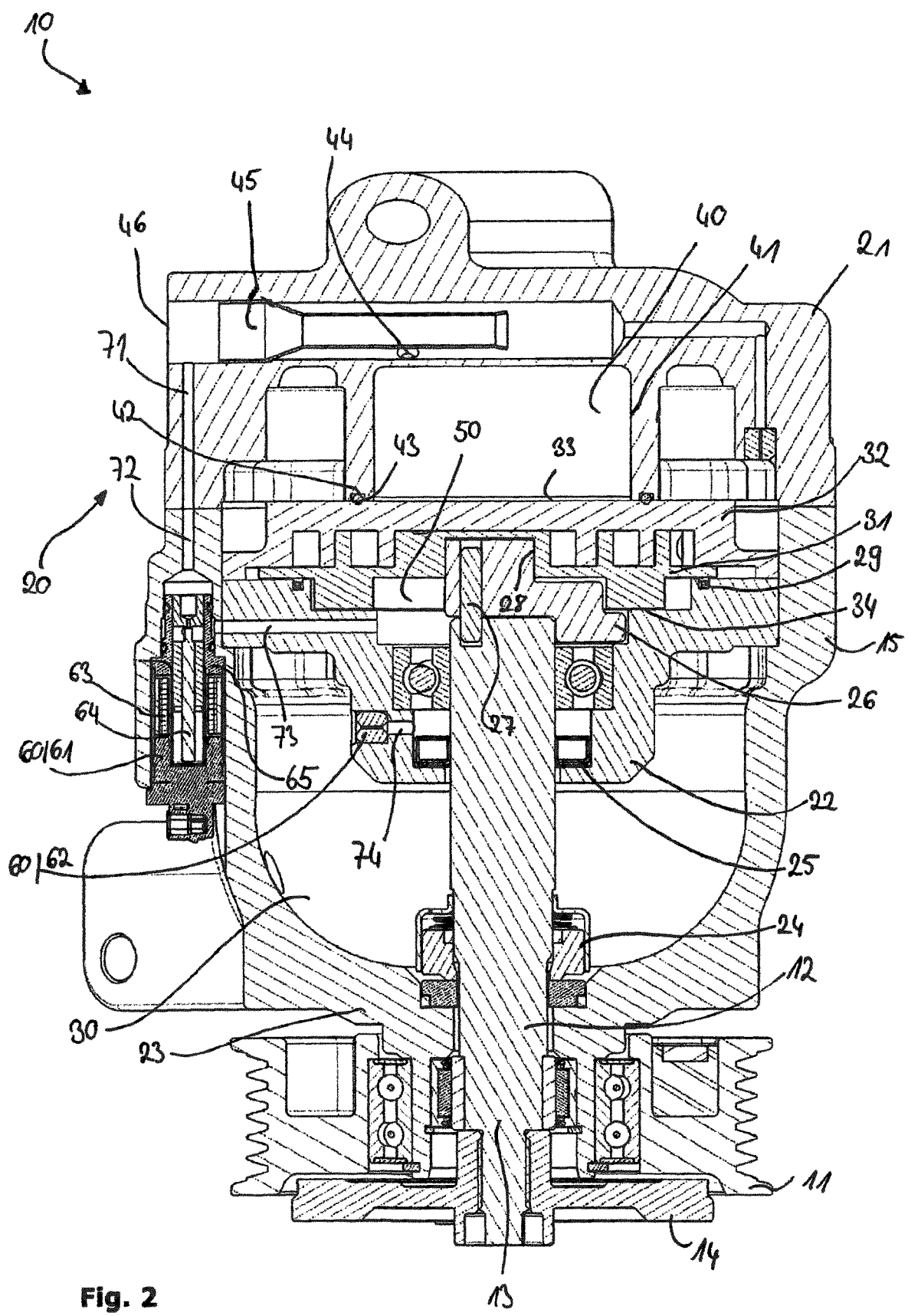
FIG. 2 shows a longitudinal section through a displacement machine according to the invention, in particular a scroll compressor according to a second embodiment.

The scroll compressor 10 described in detail in conjunction with FIG. 1 and FIG. 2 may, for example, be used as a compressor in a vehicle air-conditioning system. A vehicle air-conditioning system such as a $CO_2$ vehicle air-conditioning system typically comprises a gas cooler, an inner heat exchanger, a throttle, an evaporator and a compressor. The compressor may thus be the scroll compressor 10 which is depicted. In other words the scroll compressor 10 is a displacement machine according to the spiral principle.

The scroll compressor 10 depicted comprises a mechanical drive 11 in the form of a belt pulley. In use the belt pulley is connected to an electric motor or a combustion engine. Alternatively it is possible for the scroll compressor 10 to be driven electrically or by an electric motor.

Moreover the scroll compressor 10 comprises a housing 20 with an upper housing part 21, which closes the high-pressure side of the scroll compressor. In the housing 20 a housing partition 22 is formed which limits a low-pressure chamber 30. The low-pressure chamber 30 may also be called a suction chamber. A through-opening through which a drive shaft extends is formed in the housing floor 23. The shaft end 13 arranged outside the housing 20 is non-rotatably connected to a follower 14, which engages in the belt pulley rotatably mounted on the housing 20, so that a torque can be transferred from the belt pulley to the drive shaft 12.

The drive shaft 12 is rotatably mounted, on the one side, in the housing floor 23 and on the other side, in the housing partition 22. Sealing of the drive shaft 12 against the housing floor 23 is effected by a first shaft seal 24 and, against the housing partition 22, is effected by a second shaft seal 25.

The scroll compressor 10 further comprises a movable, in particular orbiting, displacement spiral 31 and a counter-spiral 32. The displacement spiral 31 and the counter spiral 32 engage with each other. The counter-spiral 32 is preferably stationary both in circumferential direction and in radial direction. The movable displacement spiral 31 coupled to the drive shaft 12 describes a circular path, so that due to this movement a number of gas pockets or gas chambers are created in a manner known as such, which migrate radially inwardly between the displacement spiral 31 and the counter-spiral 32. This orbiting movement causes the working medium, in particular the refrigerant, to be sucked in and to be compressed by the further spiral movement and the associated reduction of the gas chamber. The working medium, in particular the refrigerant, is radially compressed from the outside to the inside, for example in a linearly increasing manner, and ejected into the high-pressure chamber 40 in the centre of the counter-spiral 32.

In order to generate an orbiting movement of the displacement spiral 31, an eccentric bearing 26 is formed, which is connected to the drive shaft 12 by means of an eccentric pin 27. The eccentric bearing 26 and the displacement spiral 31 are arranged eccentrically relative to the counter-spiral 32. The gas chambers are separated from one another in a pressure-tight manner due to the fact that the displacement spiral 31 is supported against the counter-spiral 32. The radial contact pressure between the displacement spiral 31 and the counter-spiral 32 is achieved by the eccentricity.

The rotational movement of the displacement spiral 31 can for example be avoided by providing guide pins and guide bores.

The scroll compressors shown in FIGS. 1 and 2 are without a coupling. Nevertheless, in order to be able to vary the output of the compressor, the scroll compressor can be connected and disconnected. To this end it is provided that the displacement spiral 31 is movable in axial direction, i.e. in a direction parallel to the drive shaft 12. This allows the displacement spiral 31 to be moved in direction of the counter-spiral 32. Provided that the displacement spiral 31 does not rest on the counter-spiral 32, an open position of the scroll compressor 10 is formed. In this open position a pressure-equalisation gap is formed between the displacement spiral 31 and the counter-spiral 32, which connects the gas chambers, which in radial direction are separated from each other, between the displacement spiral 31 and the counter-spiral 32. This pressure equalisation gap formed in such a way as to allow compressed gas to flow radially outwards from the chambers arranged further inwards, so that an equalisation of pressure takes place. The output of the scroll compressor 10 is thereby reduced to zero or at least approximately to zero.

The counter-spiral 32 is arranged downstream of the high-pressure chamber 40 in flow direction and is fluidically connected to the counter-spiral 32 by an outlet not shown. The outlet is preferably not exactly arranged in the centre of the counter-spiral 32, but is located away from the centre in the area of the innermost chamber between the displacement spiral 31 and the counter-spiral 32. As a result the outlet of the bearing bushing 28 of the eccentric bearing 26 is not covered and the finally compressed working medium, in particular the finally compressed refrigerant, can be ejected into the high-pressure chamber 40.

The back wall 33 of the counter-spiral 32, in sections, forms the floor of the high-pressure chamber 40. The back wall 33 is wider than the high-pressure chamber 40. The high-pressure chamber 40 is laterally limited by the side wall 41. A recess 42, in which a gasket 43 is arranged, is formed in one end of the side wall 41 pointing to the back wall 33 of the counter-spiral 32. The side wall 41 is a circumferential wall, which forms a stop for the counter-spiral 32. The high-pressure chamber 40 is formed in the upper housing part 21. This has a rotationally symmetric cross-section.

The compressed working medium which has collected in the high-pressure 40 flows through an outlet 44 from the high-pressure chamber 40 into an oil separator 45, which in this case is configured as a cyclone separator. The compressed working medium, in particular the compressed refrigerant, flows through the oil separator 45 and the opening 46 into the circular flow of the exemplary air-conditioning system.

Axial guidance of the displacement spiral 31 in direction of the counter-spiral 32 or in the opposite direction is realised in that a back wall 34 of the displacement spiral 31 is acted upon by an appropriate pressure. To this end the counter-pressure chamber 50, which could also be called the back-pressure chamber, is fluidically connected with the high-pressure side of the scroll compressor 10, in particular the high-pressure chamber 40. The eccentric bearing 26 is located in the counter-pressure chamber 50.

The counter-pressure chamber 50 is limited by the back wall 34 of the displacement spiral 31 and by the housing partition 22.

The counter-pressure chamber 50 is separated in a fluid-tight manner from the low-pressure chamber 30 by the already described second shaft seal 25. A sealing and gliding ring 29 sits in an annular groove in the housing partition 22. A gap (not shown) is formed between the housing partition 22 and the displacement spiral 31. Therefore the displacement spiral 31 does not support itself directly in axial direction against the housing partition 22, but against the sealing and gliding ring 29 and glides on the same.

The explanations given up to now refer to a scroll compressor 10, both as regards the embodiment shown in FIG. 1 and the embodiment depicted in FIG. 2.

FIG. 1 also shows that a pressure regulating device 60 is fluidically connected to the counter-pressure chamber 50. With the aid of the pressure regulating device 60 a pressure difference can be determined between the counter-pressure chamber 50 and the low-pressure chamber 30. The pressure regulating device 60 comprises an electrically controllable regulating valve 61. The electrically controllable regulating valve 61 establishes a fluid connection between the counter-pressure chamber 50 and the low-pressure chamber 30. The electrically controllable regulating valve 61 is shown in detail in FIG. 3.

The throttle 62 is arranged between the high-pressure chamber 40 and the counter-pressure chamber 50. The pressure regulating unit 60 thus includes the throttle 62 and the electrically controllable regulating valve 61. The counter-pressure chamber 50 is connected to the high-pressure side, in particular to the high-pressure chamber 40, of the scroll compressor 10. The counter-pressure chamber 50 is connected to the oil separator 45 via a first line section 51 and a second line section 52. The throttle 62 is formed between the first line section 51 and the second line section 52. The first line section 51 is formed in the housing 20, in particular in the upper housing part 21. The second line section 52 is also formed section-wise in the housing 20, in particular in the circumferential wall 15.

The last portion of the second line section, i.e. the portion of the second line section 52 which ends in the counter-pressure chamber 50, is formed as a through-passage in the housing partition 22. With the aid of the working medium in the counter-pressure chamber 50, in particular as a function from the pressure prevailing therein, the displacement spiral 31 can be axially moved in direction of the counter spiral 32. The contact pressure acting in axial direction from the displacement spiral 31 onto the counter spiral 32 can be adjusted by the pressure prevailing in the counter-pressure chamber 50.

The regulating valve 61 is additionally provided for this purpose. This is also formed in the circumferential wall 15 of the housing 20. A first discharge section 53 is in turn formed in the housing partition 22. The first discharge section 53 ends in the electrically controllable regulating valve 61 by means of a line section formed in the circumferential wall 15. The circumferential wall 15 also has a second discharge section 54 formed in it, which establishes a connection between the regulating valve 61 and the low-pressure chamber 30.

In order to regulate the pressure prevailing in the counter-pressure chamber 50 and/or in order to set variable operating points for the pressure in the counter-pressure chamber 50, the pressure value $P_D$ is initially ascertained in the high-pressure section of the scroll compressor 10, in particular in the high-pressure chamber 40. This value is then forwarded to a computing unit. By means of the ascertained pressure value $P_D$ a differential pressure value $\Delta P_{BP}$ is determined, which is effective between the counter-pressure $P_{BP}$ in the counter-pressure chamber 50 and the low pressure $P_S$ in the low-pressure chamber 30. This is preferably done by way of a characteristic line and/or a characteristic field using the ascertained pressure value $P_D$. The characteristic line and/or the characteristic field is stored in the computing unit.

The pressure regulating device 60, in particular the electrically controllable regulating valve 61 is thereupon controlled by way of the determined differential pressure value $\Delta P_{BP}$. This is done applying a control current to the magnetic coil 63 of the regulating valve 61.

The determined differential pressure value $\Delta P_{BP}$ is associated with an electric amperage for controlling the valve element 61 so that an electromagnetic force can be set which acts on the valve needle 64.

The valve needle 64 is impacted by both a spring force originating from a spring (see FIG. 3) and the force/pressure of the counter-pressure chamber 50, as well as the force/pressure of the low-pressure chamber 30. In addition the electromagnetic force generated by the magnetic coil 63 also impacts the valve needle 64.

The control current acting on the magnetic coil 63 establishes an electromagnetic force, which counteracts the pressure of the counter-pressure chamber 50 and the pressure of the low-pressure chamber 30. The regulating valve 61 regulates itself independently due to an equalised pressure balance/a force equilibrium. In order to achieve an equalised force balance, the valve 61 regulates independently the pressure of the counter-pressure chamber 50 as a function of the force/the pressure prevailing in the low-pressure chamber 30. To this end a through-opening cross-section/a annular surface is set between the valve needle 64 and the housing 65 (see FIG. 3).

FIG. 2 shows as further embodiment of a scroll compressor 10. This scroll compressor 10 also comprises a pressure regulating device 60. The pressure regulating device 60 also comprises a regulating valve 61 and a throttle 62. The electrically controllable regulating valve 61 establishes a fluid connection between the high-pressure side, in particular the high-pressure chamber 40, and the counter-pressure chamber 50. The fluid connection between the high-pressure chamber 40 and the counter-pressure chamber 50 passes indirectly through the oil separator 45.

To this end a first line section 71 is formed in the vicinity of the opening 46. This is formed in the upper housing part 21. There follows a second line section 72 which is formed in the circumferential wall 15 of the housing 20. The counter-pressure chamber 50 can be supplied via the regulating valve 61 with a working medium, in particular a refrigerant, which flows via the oil separator 45 from the high-pressure chamber 40 into the counter-pressure chamber 50.

A feed line 73 is formed in the housing partition 22 between the regulating valve 61 and the counter-pressure chamber 50. The throttle 62, on the other hand, is formed between the low-pressure chamber 30 and the counter-pressure chamber 50. A discharge section 74 is formed between the counter-pressure chamber 50 and the throttle 62. The fluid connection between the counter-pressure chamber 50 and the low-pressure chamber 30 passes through the discharge section 74 as well as the throttle 62.

This embodiment of the invention also allows a pressure difference to be adjusted between the counter-pressure chamber 50 and the low-pressure chamber 30. To this end a pressure value $P_D$, in particular a high-pressure value, is ascertained in the high-pressure section of the scroll compressor 10, in particular in the high-pressure chamber 40 of the scroll compressor 10. In addition the pressure value, in particular low pressure $P_S$, is ascertained in the low-pressure section, in particular in the low-pressure chamber 30 of the scroll compressor 10. These two values are forwarded to a computing unit. The differential pressure value $\Delta P_{BP}$ between the counter-pressure $P_{BP}$ in the counter-pressure chamber 50 and the low pressure $P_S$ in the low-pressure chamber 30 can again be ascertained by way of a characteristic line with the aid of ascertained pressure values. To this end the characteristic line or a characteristic field is stored in the computing unit.

Then follows activation of the pressure regulating device 60, in particular the electrically controllable regulating valve 61 in that a control current is applied to the magnetic coil 63. In this case the valve needle 64 of the regulating valve 64 is impacted by the spring force, the pressure $P_{BP}$/the force of the counter-pressure chamber 50, as well as the pressure $P_D$/the force of the high-pressure chamber 40 and the electromagnetic force generated by the magnetic coil 63. The differential pressure value $\Delta P_{BP}$ may be set by setting a through-opening cross-section between the valve needle 64 and the housing 65 of the regulating valve 61. In this way a flow cross-section is automatically set by the regulating valve 61 between the high pressure $P_{BP}$ in the high-pressure chamber 40 and the counter-pressure $P_{BP}$ of the counter-pressure chamber 50.

Figure 3:
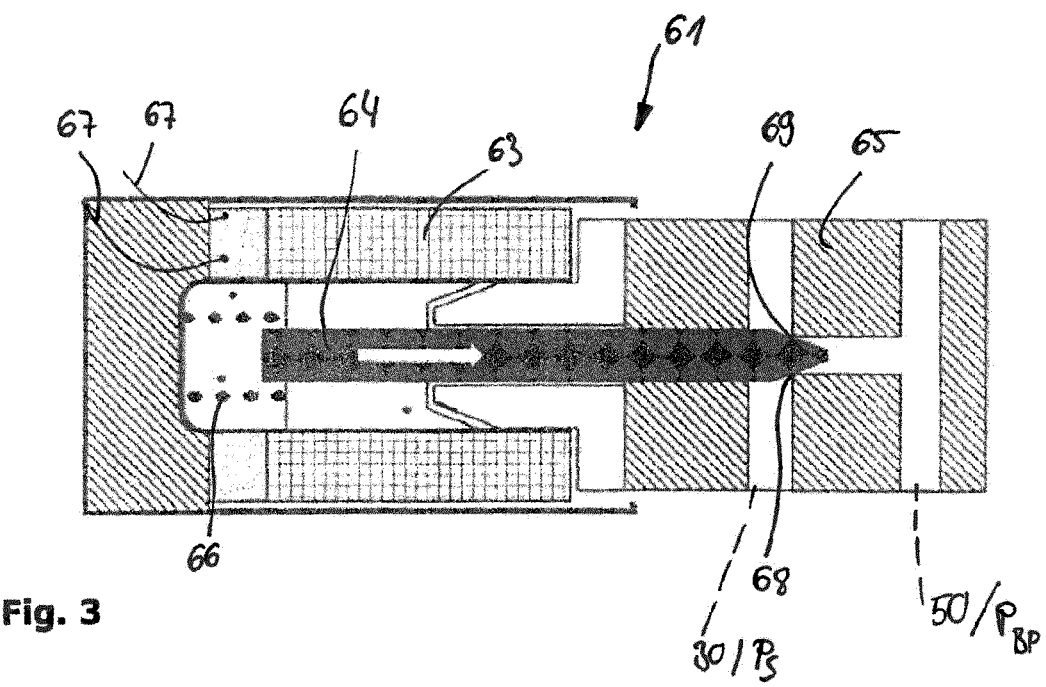
FIG. 3 a longitudinal section through an electrically controllable regulating valve.

FIG. 3 shows a regulating valve 61, in particular a regulating valve 61 as required in the embodiment of FIG. 1. A valve needle 64 is formed in the regulating valve 61. This figure also shows the spring 66, the force of which acts on the valve needle 64. The valve needle 64 is arranged within a magnetic coil 63. A current can be applied to the magnetic coil 63 via the feed lines 67, so that depending on the control current flowing through the feed lines 67 to the magnetic coil 63 an electromagnetic force acts on the valve needle 64, which is adjustable.

The broken lines indicate that the regulating valve 61 comprises a feed line to the counter-pressure chamber 50 and to the low-pressure chamber 30.

The top 69 of the valve needle 64 may be supported against a housing section 65 such that an annular gap 68 is formed between the housing 65 and the top 69. The pressure difference $\Delta P_{BP}$ between the counter-pressure chamber 50 and the low-pressure chamber 30 can be set in dependence of the size of this annular gap 68.

The counter-pressure in the counter-pressure chamber 50 is $P_{BP}$, whereas a low pressure $P_S$ prevails in the low-pressure chamber 30.

Figure 4:
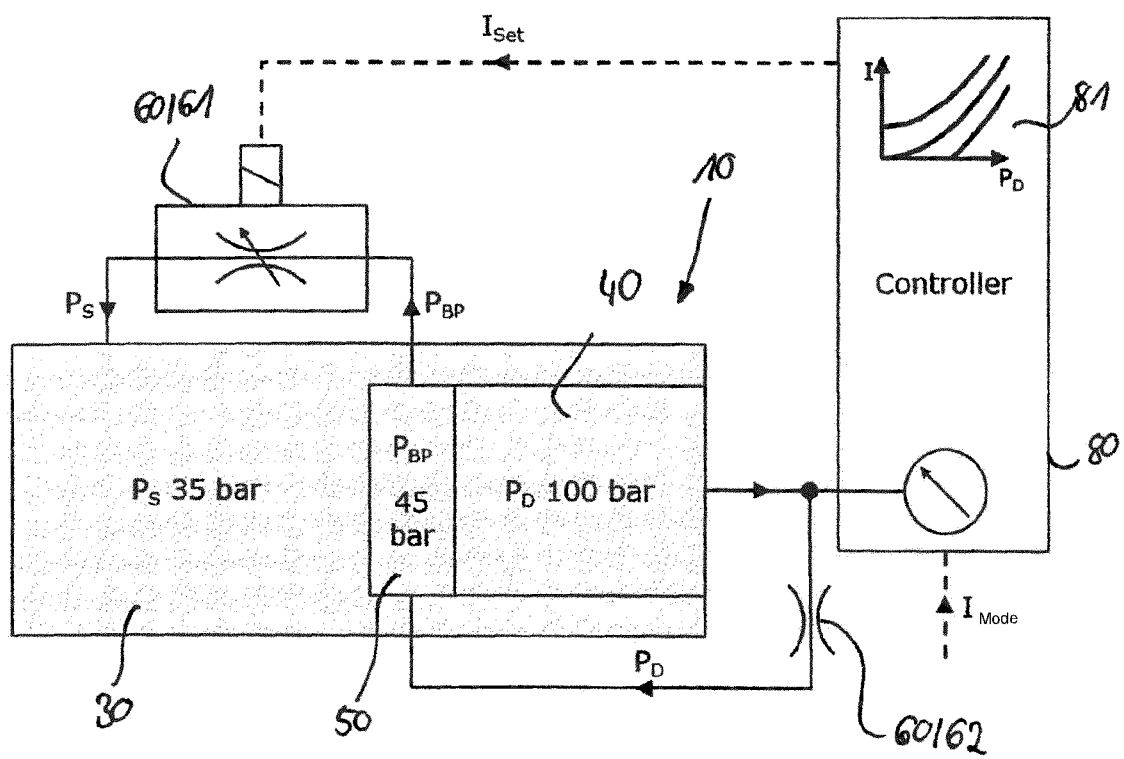
FIG. 4 show a principal view regarding a first embodiment of a method according to the invention for operating a displacement machine.

FIG. 4 depicts the method required in relation to the embodiment as per FIG. 1.

As shown, a pressure $P_D$ of 100 bar prevails in the high-pressure chamber 40. This pressure is measured and read by, or forwarded to, a computing unit. The pressure of 100 bar is reduced to 45 bar by the throttle 45, so that a working medium flowing from the high-pressure chamber 40 into the counter-pressure chamber 50, has a pressure $P_{BP}$ of 45 bar when in the counter-pressure chamber 50.

The regulating valve 61 is arranged between the counter-pressure chamber 50 and the low-pressure chamber 30. The regulating valve 61 is a mechanically self-regulating valve, wherein the magnetic coil in the regulating valve 61 (not shown here) is controlled by the computing unit. For this purpose the computing unit 80 determines a differential pressure value $\Delta P_{BP}$, wherein each differential pressure value $\Delta P_{BP}$ has a control current I associated with it, so that by means of the pressure value $P_D$ and the characteristic field 81 stored in the computing unit 80 a control current I in respect of the magnetic coil is ascertained.

The computing unit 80 forwards the value of the control current I to the magnetic coil of the regulating valve 61. Due to the control current I the magnetic coil of the valve element 61 is subjected to an electric amperage, so that an electromagnetic force can be set which acts on the valve needle 64.

REFERENCE LIST 10 scroll compressor
11 mechanical drive
12 drive shaft
13 shaft end
14 follower
15 circumferential wall
20 housing
21 upper housing part
22 housing partition
23 housing floor
24 first shaft seal
25 second shaft seal
26 eccentric bearing
27 eccentric pin
28 bearing bushing
29 sealing and gliding ring
30 low-pressure chamber
31 displacement spiral
32 counter-spiral
33 back wall of counter-spiral
34 back wall of displacement spiral
40 high-pressure chamber
41 side wall
42 recess 43 gasket
44 outlet
45 oil separator
46 opening
50 counter-pressure chamber
51 first line section
52 second line section
53 first discharge section
54 second discharge section
60 pressure regulating device
61 regulating valve
62 throttle
63 magnetic coil
64 valve needle
65 housing
66 spring
67 feed line
68 annular gap
69 top
71 first line section
72 second line section
73 feed line
74 discharge section
80 computing unit
81 characteristic field
I control current
$P_D$ pressure in the high-pressure section
$P_S$ pressure in the low-pressure section
$P_{BP}$ counter-pressure
$\Delta P_{BP}$ differential pressure value

The invention claimed is:

1. A method for operating a displacement machine, the method comprising:
  a) ascertaining a pressure value $P_D$ in a high-pressure chamber of the displacement machine or in a high-pressure section of a system in which the displacement machine has been installed,
  b) forwarding the ascertained pressure value $P_D$ to a computing unit,
  c) determining a differential pressure value $\Delta P_{BP}$ between a counter-pressure $P_{BP}$ prevailing in a counter-pressure chamber and a low-pressure $P_S$ prevailing in a low-pressure chamber by way of a characteristic line and/or a characteristic field with the aid of the pressure value $P_D$, wherein the characteristic line and/or the characteristic field is stored in the computing unit, wherein the counter-pressure chamber is formed between the low-pressure chamber and an orbiting displacement spiral such that chambers are formed between the displacement spiral and a counter-spiral for receiving a working medium, and wherein a pressure regulating device fluidically connected to the counter-pressure chamber sets a pressure difference between the counter-pressure chamber and the low-pressure chamber by means of a set value specified by the computing unit, and
  d) controlling the pressure regulating device by means of a control current applied to a magnetic coil and autonomously adjusting the differential pressure value $\Delta P_{BP}$ by means of an electrically controllable regulating valve, wherein the pressure regulating device comprises the electrically controllable regulating valve and a throttle, wherein the electrically controllable regulating valve includes a movable valve needle which can be electrically activated.

2. A method for operating the displacement machine according to claim 1, the method comprising:
  a) ascertaining $P_S$ in the low-pressure chamber of the displacement machine,
  b) forwarding $P_S$ to the computing unit,
  c) determining a differential pressure value $\Delta P_{BP}$ with the aid of $P_S$.

3. A method according to claim 1, wherein when controlling the pressure regulating device, the determined differential pressure value $\Delta P_{BP}$ is associated with the control current for activating the valve needle, which is arranged in the magnetic coil.

4. A method according to claim 3, wherein the magnetic coil of the pressure-regulating device is acted upon by the control current, so that an electromagnetic force acting on the valve needle is set.

5. A method according to claim 1
  wherein the working medium is $CO_2$ and/or R134a and/or R1234yf and/or butane and/or ethanol and/or cyclopentane,
  wherein the displacement spiral is movable in axial direction relative to the counter-spiral, and
  wherein a contact pressure effective in the axial direction from the displacement spiral onto the counter-spiral can be adjusted by the pressure prevailing in the counter-pressure chamber.

6. The method according to claim 5,
  wherein radially inward migrating chambers are formed between the displacement spiral and the counter-spiral, in order to suck in the working medium from the low-pressure chamber, to compress it and to eject it into the high-pressure chamber.

7. The method according to claim 5,
  wherein radially outward migrating chambers are formed between the displacement spiral and the counter-spiral, in order to receive the working medium from the high-pressure chamber, to expand it and push it out into the low-pressure chamber.

8. The method according to claim 5,
  wherein the electrically controllable regulating valve fluidically connects the counter-pressure chamber with the high-pressure chamber or the low-pressure chamber.

9. The method according to claim 5, wherein the electrically controllable regulating valve fluidically connects the counter-pressure chamber to the low-pressure chamber,
  wherein the throttle is arranged between the high-pressure chamber and the counter-pressure chamber.

10. The method according to claim 5, wherein the electrically controllable regulating valve fluidically connects the high-pressure chamber and the counter-pressure chamber,
  wherein the throttle is arranged between the counter-pressure chamber and the low-pressure chamber.

11. The method according to claim 5, wherein the displacement machine is configured as an electrically driven displacement machine and/or a displacement machine driven by an electric motor or as a displacement machine with mechanical drive.

12. A method according to claim 5, further wherein the displacement machine is a scroll compressor of a vehicle air-conditioning system.

13. A method according to claim 12, wherein the vehicle air-conditioning system contains $CO_2$ and/or R134a and/or R1234yf and/or butane and/or ethanol and/or water as refrigerant.

14. A method according to claim 5, further wherein the displacement machine is installed in a vehicle.

* * * * *